Feb. 8, 1944.   H. O. PETERSON   2,341,238

AUXILIARY POWER SUPPLY

Filed Aug. 25, 1942

INVENTOR
HAROLD O. PETERSON.
BY H. G. Grover
ATTORNEY

Patented Feb. 8, 1944

2,341,238

UNITED STATES PATENT OFFICE 2,341,238

AUXILIARY POWER SUPPLY

Harold O. Peterson, Riverhead, N. Y., assignor to Radio Corporation of America, a corporation of Delaware Application August 25, 1942, Serial No. 456,016

6 Claims. (Cl. 171—97)

This invention relates to a new and useful auxiliary power supply system, which is particularly adapted to small radio receiving stations, although not specifically limited thereto.

An object of this invention is to provide a reliable and inexpensive auxiliary power supply for small radio stations.

Another object of this invention is to provide a novel circuit arrangement of an auxiliary power supply wherein a battery of dry cells may be employed as the auxiliary supply source.

A feature of this invention is the use of a battery of dry cells, which are incorporated with a uni-directional conductive device connected in series with the battery to prevent rectified alternating current from flowing through the battery of dry cells.

Figure 1:
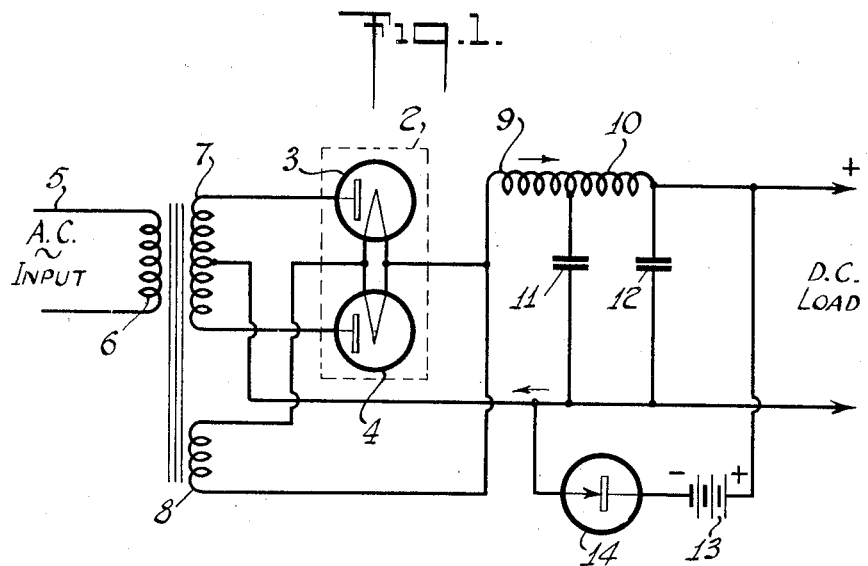
Figure 2:
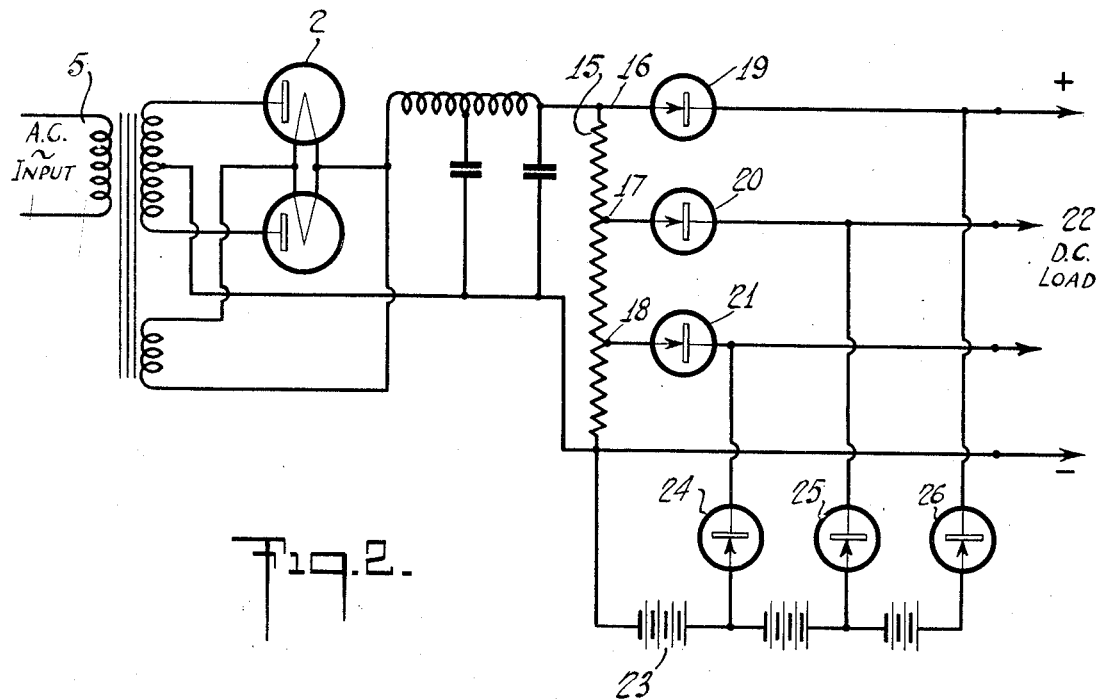

In the prior art, the auxiliary supply for radio receiving stations has been provided generally by the use of storage batteries, and while such a system is satisfactory, it is very expensive, both as to the original cost and subsequent maintenance. This invention greatly simplifies and reduces the cost of maintenance of the auxiliary supply system, as will be described by the accompanying drawing, in which:

Fig. 1 is a circuit diagram of a simple system showing the principle of the invention; and Fig. 2 shows the invention as applied to a voltage divider which forms the power source of a radio receiver.

Referring now in detail to Fig. 1 of the drawing, the radio receiving station direct current load is normally carried by a rectifier 2, which generally includes a pair of rectifier tubes 3 and 4, which are energized by means of an alternating current input source 5 which is connected to the primary 6 of a transformer. The transformer also includes a secondary 7 and filament windings 8. The rectifier 2 has a filter which includes inductances 9 and 10, and condensers 11 and 12. The stand-by battery 13, which forms the auxiliary supply source of direct current load, is connected to the positive side of the direct current load. A uni-directional conductive device 14 is connected in series between the negative side of battery 13 and the negative side of the direct current load. The battery 13 is preferably composed of dry cells. The voltage of the battery 13 should be about equal to the voltage normally produced by the rectifier 2 so that the battery will not discharge when the alternating current rectifier is functioning. At the same time, the voltage should be of sufficient value so that there will not be too much of a decrease in the voltage supplied to the load when the normal alternating current power fails. The uni-directional conductive device 14 may be any suitable uni-directional conductive device; for example, a copper oxide rectifier.

The uni-directional device 14 is connected so as to prevent the charging current from rectifier 2 from flowing into the battery 13, and at the same time, allowing the battery to discharge into the load when the alternating input power supply 5 fails.

Referring now to Fig. 2 of the drawing, the same principle as disclosed in Fig. 1 is applied to a rectifier 2 feeding into a number of different voltages obtained across a voltage divider circuit 15. The voltage divider circuit is arranged with suitable taps 16, 17 and 18. A uni-directional conductance device 19, 20 and 21 is connected in series between each tap of the voltage divider 15 and the direct current load 22. A battery 23 of dry cells is arranged in three groups. In series with the positive side of each group there are connected uni-directional devices 24, 25 and 26. From a junction point on the lead of each uni-directional conductance device a connection is made to the direct current load 22. It will be noted that each of the uni-directional devices are so arranged that when the alternating current input power supply 5 fails, the battery 23 will discharge into the various leads of the voltage divider, which is connected to the load circuit and, because of the uni-directional conductive devices 19, 20 and 21, will not discharge back through the voltage divider network 15.

Although only two forms of this invention are shown, it is to be distinctly understood that the invention should not be limited thereto.

I claim:

1. An auxiliary direct current supply system for a radio station comprising a source of alternating current power supply and an auxiliary standby circuit, a rectifier device connected to said alternating current power supply, a filter for said rectifier including capacitance and inductance devices, a direct current load circuit connected to said filter, a battery of cells and a uni-directional conductive device connected across said direct current load whereby the direct current from said battery will flow in said load circuit upon the failure of a portion of said supply system.

2. An auxiliary direct current supply for a radio station system comprising a source of alternating current, a rectifier connected to said alternating current, a filter for said rectifier including capacitance and inductance devices, a direct current load circuit connected to the filter output portion of said rectifier, a voltage divider having taps connected across said direct current load and said rectifier, a battery of dry cells divided into a plurality of groups, each group being connected in series with a uni-directional conductive device and the taps on said voltage divider, whereby the direct current from said battery will flow in said load circuit upon the failure of a portion of said supply system.

3. An auxiliary direct current supply system comprising a source of alternating current, a rectifier connected to said alternating current, a filter for said rectifier including capacitance and inductance devices, a direct current load circuit connected to said rectifier, a voltage divider having taps connected across said direct current load and said rectifier, a battery of dry cells divided into a plurality of groups, each group being connected in series with two uni-directional conductance devices and the taps on said voltage divider, a connection to said load circuit at a junction point on the lead between the series connection of each group of uni-directional conductance devices, each group of uni-directional devices being connected in opposed directions, whereby the direct current from said battery will flow in said load circuit upon the failure of a portion of said supply system.

4. The combination of an alternating current and an auxiliary stand-by circuit, a source of alternating current, a rectifier including a pair of electron discharge tubes connected to said alternating current source, a direct current load circuit connected to said rectifier, a battery of dry cells and a copper oxide rectifier device connected across said direct current load whereby the direct current from said battery will flow in said load circuit upon the failure of a portion of said supply system.

5. An auxiliary direct current supply system comprising a source of alternating current, a rectifier connected to said alternating current, a filter for said rectifier including capacitance and inductance devices, a direct current load circuit connected to said rectifier, a voltage divider having taps connected across said direct current load and said rectifier, a battery of cells divided into a plurality of groups, each group being connected in series with a copper oxide rectifier device and the taps on said voltage divider, whereby the direct current from said battery will flow in said load circuit upon the failure of a portion of said supply system.

6. An auxiliary direct current supply system comprising a source of alternating current, a rectifier connected to said alternating current, a direct current load circuit connected to said rectifier, a voltage divider having taps connected across said direct current load and said rectifier, a battery of cells divided into a plurality of groups, each group being connected in series with two copper oxide rectifier devices and the taps on said voltage divider, the copper oxide rectifier devices of each group being connected in opposed directions, and a connection to said load circuit at a junction point on the lead between the series connection of each group of uni-directional conductance devices whereby the direct current from said battery will flow in said load circuit upon the failure of a portion of said supply system.

HAROLD O. PETERSON.